Dec. 19, 1967 J. E. SCHEIDT 3,358,835
FILTER CONDITION INDICATOR
Filed Aug. 2, 1965
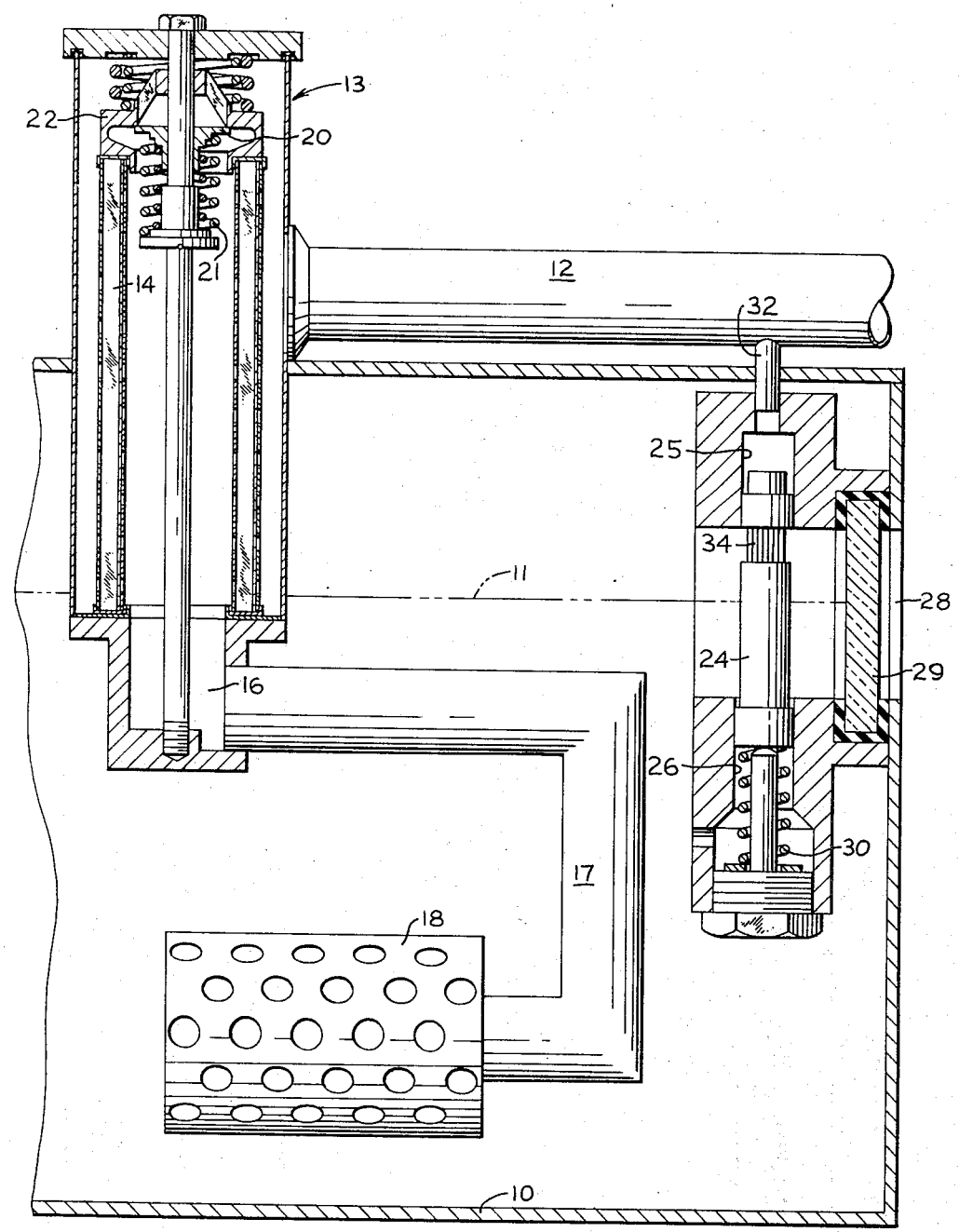
INVENTOR.
JAMES E. SCHEIDT
BY
Fryer, Tjensvold, Feix & Phillips
ATTORNEYS

United States Patent Office 3,358,835
Patented Dec. 19, 1967

3,358,835
FILTER CONDITION INDICATOR
James E. Scheidt, Joliet, Ill., assignor to Caterpillar Tractor Co., Peoria, Ill., a corporation of California
Filed Aug. 2, 1965, Ser. No. 476,374
1 Claim. (Cl. 210—90)

ABSTRACT OF THE DISCLOSURE

An indicator for a fluid filter to provide visual indication that a pervious filter element therein is becoming overburdened with filtered material in which a piston-like indicating element is subjected to low tank pressure at one end and return line pressure from the inlet side of the filter at the other end so that the piston is moved upon significant increase in return line pressure.

---

My assignee's Patent No. 2,678,134 to Frank Middleton discloses a filter indicator designed for the purpose described but employing a rather complex indicator in the form of a pressure dial. As set forth in said patent, one of the principal difficulties encountered in a filter for lubricating or hydraulic oil is that of determining when the filter element has become so coated or clogged that it is no longer useful. Such filters are employed for removing foreign solid particles from the oil and as the solids are collected, the flow of oil through the filter is gradually restricted. In the past, there has been no way for the vehicle operator to know when this restriction becomes excessive and as a result it has been the practice to change the filter element periodically and at intervals based upon past experience. This method has the disadvantage that the filter may be either inoperative prior to the time it is replaced or on the other hand, it may have many hours of satisfactory life remaining.

The possibility of operating a hydraulic circuit with an inoperative filter is of principal concern because continued operation after a filter has become clogged will result in excessive back pressure in the return portion of the circuit and possible rupture of the filter element or, in the event that a filter bypass is included in the system, unfiltered oil will be recirculated through the hydraulic system. In either case, excessive wear in the circuit components may occur.

It is, therefore, an object of the present invention to provide a filter condition indicator which operates on differential pressures sensed at the intake and the outlet side of a filter and which provides visual indication that the filter element is being clogged and to provide such a device of simple inexpensive construction disposed in a position where it is unlikely to become tampered with or abused.

A further object is to provide a combined filter condition indicator and liquid level gauge for a hydraulic oil reservoir.

Further and more specific objects and advantages of the invention are made apparent in the following specification wherein reference is made to the accompanying drawing.

The drawing is a schematic view illustrating a portion of a hydraulic reservoir, a filter illustrated in section for filtering fluid which is being returned to the reservoir and a sectional view of a combined filter indicator and sight gauge embodying the present invention.

Referring to the drawing, a reservoir or tank shown at 10 is shown for containing hydraulic oil which should be maintained approximately at the level shown by the broken line 11. A pump and distributing system (not shown) withdraws oil from the reservoir for supply to a hydraulic circuit such as a vehicle implement control system and the oil is returned to the tank by a line 12 and through a filter, generally indicated at 13. The filter is of a more or less conventional type having a filter element 14 through which the oil must pass before it is discharged through an outlet 16 disposed within the tank. The outlet communicates through a line 17 with a diffuser 18 which mixes the oil with the body of oil in the tank so that it becomes cooled and deaerated before it is recirculated through the hydraulic system.

When the filter becomes clogged, pressure in the line 12 leading thereto will rise and upon rising to a predetermined value will open a check valve 20 normally closed by a spring assembly 21 and permit oil entering the filter housing to pass through an opening in a cap 22 which closes the upper end of the filter element. It is desirable to avoid opening of the bypass valve 20 because doing so admits unfiltered oil into the tank. The filter condition indicator of the present invention is provided to avoid opening of the bypass valve.

The indicator comprises a plunger 24 reciprocable in bores 25 and 26 in a housing which is disposed within the tank and which has an open central portion to expose the plunger 24 to sight through a sight opening 28 in the housing which is sealed by a glass 29. The plunger is normally urged upwardly by a spring 30 at the lower end but is illustrated in its lowermost or depressed position which is caused by pressure in the line 12 communicated to the upper end of the plunger through a line 32. The force of the spring 30 is preferably such that the plunger will be depressed just before pressure in the line 12 attains a value sufficient to open the bypass valve 20. The main body of the plunger 24 is preferably painted white or a light color so that the oil level in the tank can be readily ascertained by looking through the glass 29. Adjacent its upper end the plunger has a red portion shown at 34 which is concealed from view when the plunger is in its upper position but is visible through the sight opening when the plunger is depressed. Thus an operator is advised by the indicator that the return oil pressure is dangerously high and can change the filter before oil is bypassed. Because of the location of the filter condition indicator within the tank, it also serves as a convenient depth indicator.

I claim:

In a hydraulic system which includes a filter between a fluid return line and a tank, means to indicate a high pressure differential between the inlet and outlet side of the filter and thereby indicate the presence of heavy deposits in the filter, said means comprising a window in the tank, a piston in the tank visible through said window, means communicating tank pressure and low spring pressure to one end of the piston, means communicating return line pressure to the opposite end of the piston whereby a rise in return line pressure caused by deposits in the filter will impart movement to the piston, and a normally concealed distinctive marking on the piston brought into view through said window upon such movement.

References Cited

UNITED STATES PATENTS

| | | | |
|---|---|---|---|
| 1,613,507 | 1/1927 | Feely | 210—172 |
| 3,011,470 | 12/1961 | Stoermer | 210—90 X |
| 3,056,379 | 10/1962 | Thomas | 210—90 X |
| 3,077,267 | 2/1963 | Rosaen | 210—90 |

FOREIGN PATENTS 240,347   8/1962   Australia.

SAMIH N. ZAHARNA, *Primary Examiner.*